United States Patent
Choi

(10) Patent No.: US 10,487,729 B1
(45) Date of Patent: Nov. 26, 2019

(54) VARIABLE COMPRESSION RATIO APPARATUS

(71) Applicants: Hyundai Motor Company, Seoul (KR); Kia Motors Corporation, Seoul (KR)

(72) Inventor: Myungsik Choi, Seoul (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 16/185,941

(22) Filed: Nov. 9, 2018

(30) Foreign Application Priority Data

Aug. 3, 2018 (KR) .................... 10-2018-0090952

(51) Int. Cl.
| | |
|---|---|
| *F02B 75/04* | (2006.01) |
| *F16C 3/28* | (2006.01) |
| *F02D 15/02* | (2006.01) |

(52) U.S. Cl.
CPC .......... *F02B 75/047* (2013.01); *F02B 75/048* (2013.01); *F02D 15/02* (2013.01); *F16C 3/28* (2013.01)

(58) Field of Classification Search
CPC ........ F02B 75/047; F02B 75/048; F16C 3/28; F02D 15/02
See application file for complete search history.

(56) References Cited

U.S. PATENT DOCUMENTS

| | | | | |
|---|---|---|---|---|
| 5,146,879 A | * | 9/1992 | Kume ................ | F01M 1/06 123/48 B |
| 5,417,185 A | * | 5/1995 | Beattie ............... | F02B 75/04 123/48 B |
| 6,752,105 B2 | * | 6/2004 | Gray, Jr. ............ | F02B 75/045 123/48 B |
| 7,533,638 B1 | * | 5/2009 | Berger ............... | F02B 75/045 123/48 B |

(Continued)

FOREIGN PATENT DOCUMENTS

| | | |
|---|---|---|
| JP | H 02-99729 A | 4/1990 |
| JP | 08-009386 A | 3/1996 |

(Continued)

*Primary Examiner* — Hung Q Nguyen
(74) *Attorney, Agent, or Firm* — Mintz Levin Cohn Ferris Glovsky and Popeo, P.C.; Peter F. Corless

(57) ABSTRACT

A variable compression ratio apparatus is provided and is installed within an engine rotating a crankshaft upon receiving combustion power of a mixture from a piston and changes a mixture compression ratio based on an engine driving condition. The apparatus includes a connecting rod at which a small end forming a circular aperture to be rotatably connected with a piston pin moving together with the piston, a larger end rotatably connected with a crankpin eccentrically arranged with respect to the crankshaft, and an acting oil passage formed to supply hydraulic pressure from the larger end to the small end, are formed. An eccentric cam is concentrically arranged and rotatably disposed in the small end aperture and the piston pin is eccentrically inserted thereinto and is rotatably connected therewith. A (Continued)

latching pin selectively latches the small end with the cam by supply of hydraulic pressure through the acting oil passage.

21 Claims, 11 Drawing Sheets

(56) References Cited

U.S. PATENT DOCUMENTS

| | | | |
|---|---|---|---|
| 8,360,031 B2* | 1/2013 | Lee | F02D 15/02 |
| | | | 123/483 |
| 9,140,182 B2* | 9/2015 | Woo | F02B 75/045 |
| 10,247,093 B2* | 4/2019 | Miller | F02B 75/045 |
| 2012/0000444 A1 | 1/2012 | Yang et al. | |

FOREIGN PATENT DOCUMENTS

| | | |
|---|---|---|
| JP | H 08-089386 A | 3/1996 |
| JP | 2006-177270 A | 7/2006 |
| KR | 10-1338461 B1 | 12/2013 |

* cited by examiner

VARIABLE COMPRESSION RATIO APPARATUS

CROSS-REFERENCE TO RELATED APPLICATION

This application claims priority to and the benefit of Korean Patent Application No. 10-2018-0090952 filed on Aug. 3, 2018, the entire contents of which are incorporated herein by reference.

BACKGROUND

(a) Field of the Invention

The present invention relates to a variable compression ratio apparatus, and more particularly, to a variable compression ratio apparatus in which a compression ratio of a mixture in a combustion chamber is varied according to an operational state of an engine.

(b) Description of the Related Art

Generally, heat efficiency of a compression ignition engine is increased when a compression ratio is high, and for a spark ignition engine, when ignition timing is advanced to a particular level, heat efficiency is increased. However, when ignition timing of a spark ignition engine is advanced at a high compression ratio, abnormal combustion occurs to damage the engine, causing a limitation in advancing the ignition timing and a corresponding degradation of output should be tolerated. A variable compression ratio (VCR) apparatus is an apparatus that changes a compression ratio of a mixture based on an operational state of an engine. According to the VCR apparatus, a compression ratio of a mixture is increased in a low load condition to enhance mileage (or fuel efficiency), and the compression ratio of the mixture is decreased in a high load condition to prevent generation of knocking and enhance engine output.

The related art VCR apparatus implements a change in a compression ratio by changing a length of a connecting rod that connects a piston and a crankshaft. In the VCR apparatus, the part that connects the piston and the crankshaft includes several links, to allow combustion pressure to be directly transmitted to the links. Thus, durability of the links weakens. Various experimentation results with respect to the related art VCR apparatus have revealed that operation reliability is high when a distance between a crankpin and a piston pin is changed using an eccentric cam. Meanwhile, when hydraulic pressure is used to rotate an eccentric cam, an amount of rotation and an amount of hydraulic outflow of the eccentric cam of each cylinder are different, resulting in a compression ratio of each cylinder that is not uniform and a time during which a compression ratio is changed varies according to engine operational conditions. Further, control of latching an eccentric cam may become more difficult.

The above information disclosed in this section is merely for enhancement of understanding of the background of the invention and therefore it may contain information that does not form the prior art that is already known in this country to a person of ordinary skill in the art.

SUMMARY

The present invention provides a variable compression ratio apparatus having advantages of changing a compression ratio of a mixture by installing an eccentric cam in a small end portion of a connecting rod, and selectively latching the eccentric cam in positions that are different from each other. In addition, the present invention provides a variable compression ratio apparatus having further advantages of preventing interference by rotational inertia when latching the eccentric cam and reducing cost since a latching pin having a simplified composition to be moved in a direction which is arranged in parallel with a crankshaft is provided.

The variable compression ratio apparatus according to an exemplary embodiment of the present invention may be a variable compression ratio (VCR) apparatus installed in an engine configured to rotate a crankshaft upon receiving combustion power of a fuel mixture from a piston and may be configured to change a compression ratio of the mixture according to a driving condition of the engine.

The VCR apparatus may include: a connecting rod at which a small end forming an aperture having a circular shape to be rotatably connected with a piston pin moving together with the piston, a larger end rotatably connected with a crankpin eccentrically arranged with respect to the crankshaft, and an acting oil passage formed such that hydraulic pressure may be supplied from the larger end to the small end, may be formed; an eccentric cam concentrically arranged and rotatably disposed in the aperture of the small end and the piston pin may be eccentrically inserted thereinto and rotatably connected therewith; and a latching pin operated by hydraulic pressure supplied to the small end through the acting oil passage to selectively latch the small end with the eccentric cam. The small end and the eccentric cam may be selectively latched in one among at least two relative positions.

The VCR apparatus may include: a first plate disposed to cover a first opened surface of the small end in which the eccentric cam is inserted and seated, fixed to the eccentric cam by a fastening pin, and the piston pin may be rotatably connected thereto; and a second plate disposed to cover a second opened surface of the small end in which the eccentric cam is inserted and seated, fixed to the eccentric cam by the fastening pin, and the piston pin may be rotatably connected thereto. The latching pin may be selectively inserted into one among the first plate and the second plate to latch the small end to the eccentric cam.

The acting oil passage may include: a first oil passage that extends from the larger end to the small end in a length direction of the connecting rod to receive hydraulic pressure transferred through the crankshaft and disposed to be proximate to the first plate; a second oil passage that extends from the larger end to the small end in a length direction of the connecting rod to receive hydraulic pressure transferred through the crankshaft and disposed to be proximate to the second plate; and a communication chamber that extends in a direction of an axis of rotation in the small end to provide communication between the first oil passage with the second oil passage.

The latching pin may be disposed in the communication chamber to cause a reciprocal rectilinear motion to be moved toward the second plate by hydraulic pressure supplied through the first oil passage and to be moved toward the first plate by hydraulic pressure supplied through the second oil passage. The latching pin may be inserted into a first latching groove to latch the small end with the eccentric cam when the first latching groove recessed from an interior surface of the first plate is positioned to correspond with the communication chamber depending on rotation of the eccentric cam while maintaining hydraulic pressure for moving the latching pin toward the first plate.

A low compression ratio condition of an engine may be achieved as top dead center of the piston is to be relatively low when the latching pin is inserted into the first latching groove to latch the small end to the eccentric cam. Operation of returning the latching pin into a state that the small end is not latched to the eccentric cam may be performed as hydraulic pressure is supplied through the first oil passage while inserting the latching pin into the first latching groove.

The latching pin may be inserted into a second latching groove to latch the small end with the eccentric cam when the second latching groove recessed from an interior surface of the second plate is positioned to correspond with the communication chamber depending on rotation of the eccentric cam while maintaining hydraulic pressure for moving the latching pin toward the second plate. A high compression ratio condition of an engine may be achieved as top dead center of the piston is to be relatively high when the latching pin is inserted into the second latching groove to latch the small end to the eccentric cam. Operation of returning the latching pin into a state that the small end is not latched to the eccentric cam may be performed as hydraulic pressure is supplied through the second oil passage while inserting the latching pin into the second latching groove.

In the variable compression ratio apparatus according to one exemplary embodiment of the present invention, the latching pin may form: a first inflow aperture that extends in parallel with a length direction of the connecting rod to transfer hydraulic pressure therein from the first oil passage; a first outflow aperture in communication with the first inflow aperture to transfer hydraulic pressure transferring through the first inflow aperture out toward the first plate and extended in a direction of the axis of rotation of the small end; a first guide groove that extends along an external circumference of the latching pin to communicate with the first inflow aperture; a second inflow aperture that extends in parallel with a length direction of the connecting rod to transfer hydraulic pressure therein from the second oil passage; a second outflow aperture in communication with the second inflow aperture to transfer hydraulic pressure transferring through the second inflow aperture out toward the second plate and extended in a direction of the axis of rotation of the small end; and a second guide groove that extends along an external circumference of the latching pin to communicate with the second inflow aperture.

The first inflow aperture may be positioned to communicate with the first oil passage in a state that the small end is not latched to the eccentric cam, and the second inflow aperture may be positioned to communicate with the second oil passage in a state that the small end is not latched to the eccentric cam. The first guide groove may transfer hydraulic pressure into the first inflow aperture even while the first inflow aperture is not positioned to face the first oil passage by rotation of the latching pin, and the second guide groove may transfer hydraulic pressure into the second inflow aperture even while the second inflow aperture is not positioned to face the second oil passage by rotation of the latching pin.

A force for moving the latching pin toward the first plate may be generated as hydraulic pressure being transferred out from the second outflow aperture pushes an interior surface of the second plate when hydraulic pressure sequentially transferring through the second oil passage, the second inflow aperture, and the second outflow aperture is supplied, and then while maintaining this force, the latching pin may be inserted into a first latching groove to latch the small end to the eccentric cam when the first latching groove recessed from an interior surface of the first plate is positioned to correspond with the communication chamber depending on rotation of the eccentric cam.

Additionally, a force for moving the latching pin toward the second plate may be generated as hydraulic pressure being transferred out from the first outflow aperture pushes an interior surface of the first plate when hydraulic pressure sequentially transferring through the first oil passage, the first inflow aperture, and the first outflow aperture is supplied, and then while maintaining this force, the latching pin may be inserted into a second latching groove to latch the small end to the eccentric cam when the second latching groove recessed from an interior surface of the second plate is positioned to correspond with the communication chamber depending on rotation of the eccentric cam.

When the small end is latched with the eccentric cam by inserting the latching pin into the first latching groove, any one among a low compression ratio condition of an engine by a relatively low top dead center of the piston and a high compression ratio condition of an engine by a relatively high top dead center of the piston may be achieved. When the small end is latched with the eccentric cam by inserting the latching pin into the second latching groove, the other one among a low compression ratio condition of an engine by a relatively low top dead center of the piston and a high compression ratio condition of an engine by a relatively high top dead center of the piston may be achieved.

In the variable compression ratio apparatus according to the other exemplary embodiment of the present invention, the acting oil passage may further include: a first passage chamber formed at a circumference of the communication chamber to communicate the first oil passage with the communication chamber; a first plate chamber formed at a circumference of a first latching groove which is recessed from an interior surface of the first plate; a second passage chamber formed at a circumference of the communication chamber to communicate the second oil passage with the communication chamber; and a second plate chamber formed at a circumference of a second latching groove which is recessed from an interior surface of the second plate.

The first plate chamber may be positioned to correspond with the first passage chamber when the first latching groove is positioned to correspond with the communication chamber depending on rotation of the eccentric cam, and the second plate chamber may be positioned to correspond with the second passage chamber when the second latching groove is positioned to correspond with the communication chamber depending on rotation of the eccentric cam.

Hydraulic pressure may be stored in the second passage chamber to be transferred between an interior surface of the second plate and the latching pin when hydraulic pressure sequentially transferring through the second oil passage and the second passage chamber is supplied. In this state, the latching pin may be inserted into the first latching groove to latch the small end to the eccentric cam as hydraulic pressure stored in the second passage chamber is transferred between the latching pin and an interior surface of the second plate when the first latching groove is positioned to correspond with the communication chamber depending on rotation of the eccentric cam.

Additionally, hydraulic pressure may be stored in the first passage chamber to be transferred between an interior surface of the first plate and the latching pin when hydraulic pressure sequentially transferring through the first oil passage and the first passage chamber is supplied. In this state, the latching pin may be inserted into the second latching groove to latch the small end to the eccentric cam as hydraulic pressure stored in the first passage chamber is transferred between the latching pin and an interior surface of the first plate when the second latching groove is positioned to correspond with the communication chamber depending on rotation of the eccentric cam.

Either one among a low compression ratio condition of an engine by a relatively low top dead center of the piston and a high compression ratio condition of an engine by a relatively high top dead center of the piston may be achieved when the latching pin is inserted into the first latching groove to latch the small end to the eccentric cam. The other one among a low compression ratio condition of an engine by a relatively low top dead center of the piston and a high compression ratio condition of an engine by a relatively high top dead center of the piston may be achieved when the latching pin is inserted into the second latching groove to latch the small end to the eccentric cam.

An operation of returning the latching pin into a state that the small end is not latched to the eccentric cam may be performed as hydraulic pressure sequentially transferring through the first oil passage, the first passage chamber, and the first plate chamber is transferred in the first latching groove while inserting the latching pin into the first latching groove and may be performed as hydraulic pressure sequentially transferring through the second oil passage, the second passage chamber, and the second plate chamber is transferred in the second latching groove while inserting the latching pin into the second latching groove.

The VCR apparatus may further include a stopper rail recessed with a set length along an external circumference of the eccentric cam, and a stopper that protrudes from an interior circumference of the small end toward the eccentric cam. The stopper may be inserted into the stopper rail and be blocked to one end of the stopper rail in a circumference direction of the eccentric cam when the eccentric cam is relatively rotated from the small end, thereby limiting rotation of the eccentric cam.

The eccentric cam may be positioned to latch the small end with the eccentric cam by inserting the latching pin into either one among the first plate and the second plate when the stopper is blocked to one end of the stopper rail. The eccentric cam may be positioned to latch the small end with the eccentric cam by inserting the latching pin into the other one among the first plate and the second plate in a state that the stopper is blocked to the other end among both ends of the stopper rail.

BRIEF DESCRIPTION OF THE DRAWINGS

The above and other aspects, features and advantages of the present disclosure will be more apparent from the following detailed description taken in conjunction with the accompanying drawings, in which.

DESCRIPTION OF SYMBOLS

Figure 1:
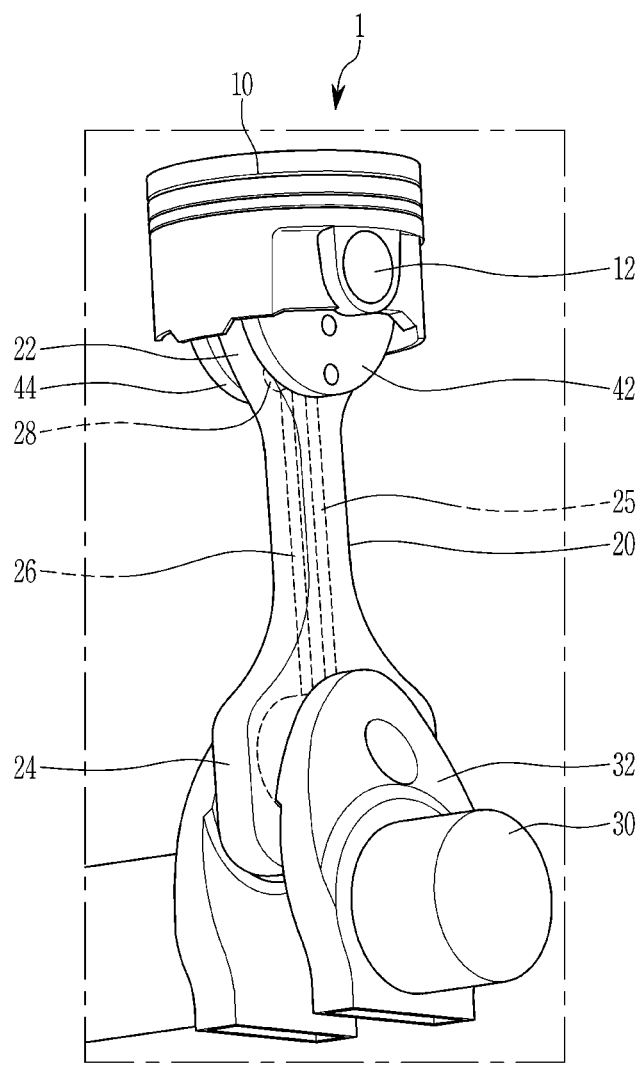
FIG. 1 is a perspective view of a variable compression ratio apparatus according to an exemplary embodiment of the present invention.

1: variable compression ratio apparatus
10: piston
12: piston pin
20: connecting rod
22: small end
24: larger end
25: first oil passage
25c: first passage chamber
26: second oil passage
26c: second passage chamber
28: communication chamber
29: stopper
30: crankshaft
32: balance weight
34: crankpin
40: eccentric cam
42: first plate
42c: first plate chamber
42g: first latching groove
44: second plate
44c: second plate chamber
44g: second latching groove
46: fastening pin
48: stopper rail
50: latching pin
51: first inflow aperture
52: first outflow aperture
53: first guide groove
56: second inflow aperture
57: second outflow aperture
58: second guide groove

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

An exemplary embodiment of the present invention will hereinafter be described in detail with reference to the accompanying drawings.

Figure 2:
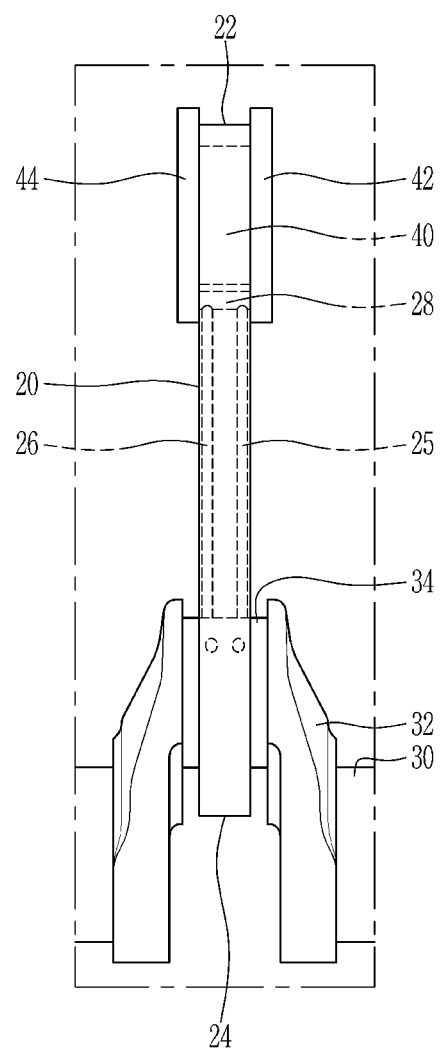
FIG. 2 is a drawing of a piston that is removed for showing a composition of a variable compression ratio apparatus according to an exemplary embodiment of the present invention.
Figure 3:
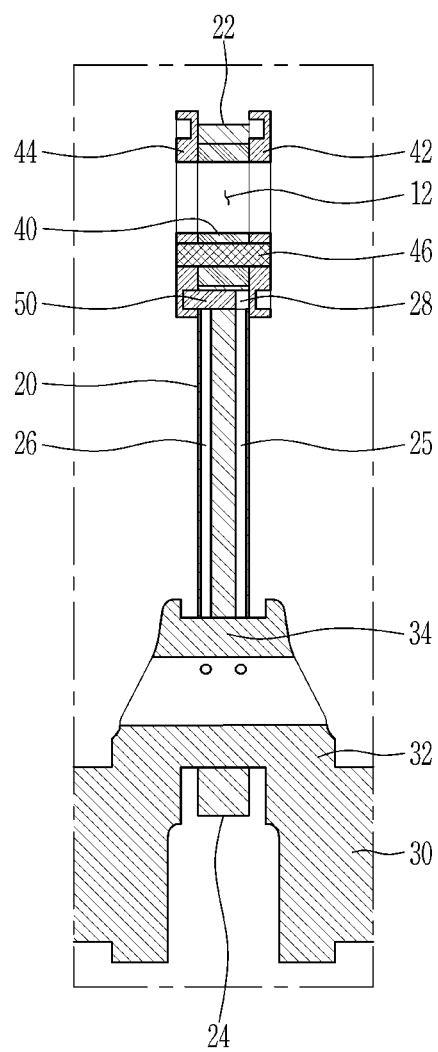
FIG. 3 is a cross-sectional view taken along a length direction of a connecting rod in FIG. 2 according to an exemplary embodiment of the present invention.

FIG. 1 is a perspective view of a variable compression ratio apparatus according to an exemplary embodiment of the present invention, FIG. 2 is a drawing of a piston that is removed for showing a composition of a variable compression ratio apparatus according to an exemplary embodiment of the present invention, and FIG. 3 is a cross-sectional view taken in a length direction of a connecting rod in FIG. 2.

FIGS. 1 to 3 illustrate a part of an engine for showing a composition of a variable compression ratio apparatus 1 according to an exemplary embodiment of the present invention. As shown in FIGS. 1 to 3, a variable compression ratio apparatus 1 according to an exemplary embodiment of the present invention is provided to an engine configured to rotate a crankshaft 30 upon receiving combustion power of a fuel mixture from a piston 10 to change a compression ratio of the mixture according to driving conditions of the engine.

The piston 10 may be configured to move vertically within a cylinder (not shown), and a combustion chamber may be formed between the top of the piston 10 and the cylinder. In addition, the crankshaft 30 may be configured to receive combustion power from the piston 10, convert the combustion power into rotational force, and transfer the rotational force to a transmission (not shown). The crankshaft 30 may be installed in a crankcase (not shown) formed in a lower end of the cylinder. Additionally, a plurality of balance weights 32 may be coupled to or formed in the crankshaft 30 to reduce vibrations generated by rotation. The basic composition and function of an engine are well known to a person of ordinary skill in the art. The variable compression ratio apparatus 1 according to an exemplary embodiment of the present invention may include a connecting rod 20, an eccentric cam 40, and acting oil passages 25, 26, and 28.

Particularly, the connecting rod 20 may be configured to receive the combustion force from the piston 10 to transmit the received combustion force to the crankshaft 30. To transmit the combustion force, a first end of the connecting rod 20 may be rotatably connected to the piston 10 by a piston pin 12 and a second end of the connecting rod 20 may be rotatably connected to the crankshaft 30 and the balance weight 32 by a crankpin 34 which is eccentrically arranged with respect to the crankshaft 30. In general, a first end portion of the connecting rod 20 connected with the piston 10 is referred to as a small end 22, and a second end portion of the connecting rod 20 connected with the crankshaft 30 to have radius of gyration that is greater than that of the small end 22 is referred to as a larger end 24.

In addition, an aperture (e.g., a bore) bored in a direction of the axis of rotation may be formed at the small end 22. The aperture of the small end 22 may be formed in a circular shape to allow the small end 22 to allow rotatably connected with the piston pin 12. Herein, it is well known to a person of ordinary skill in the art that the piston pin 12 moves vertically together with the piston 10, and in this specification, a piston pin insertion aperture 12 in which the piston pin 12 is inserted and positioned and the piston pin 12 will be represented by a same reference numeral. In this regard, an entire shape of the connecting rod 20 of the variable compression ratio apparatus 1 according to an exemplary embodiment of the present invention is similar to or the same as that of an ordinary connecting rod. Therefore, it is possible that a change of design is minimized in an ordinary engine even though the variable compression ratio apparatus is installed therein.

The eccentric cam 40 may be disposed at the small end 22 of the connecting rod 20 to be rotatably inserted into the aperture of the small end 22. In addition, the eccentric cam 40 may be formed in a circular shape having an exterior diameter which corresponds with an interior diameter of the aperture of the small end 22, and may be concentrically inserted into the aperture of the small end 22. The piston pin insertion aperture 12, into which the piston pin 12 is inserted, may be eccentrically formed at the eccentric cam 40. In other words, the piston 10 may be rotatably connected with the eccentric cam 40 as the piston pin 12 is inserted into the piston pin insertion apertures 12 formed at the piston 10 and the eccentric cam 40. Thus, the eccentric cam 40 may be configured to rotate around a circle center thereof, and simultaneously rotate around an axial center of the piston pin 12 which is arranged apart from the circle center of the eccentric cam 40. Herein, as the piston pin 12 is eccentrically inserted into the eccentric cam 40, relative positions between the axial center of the piston pin 12 and a center of the aperture of the small end 22 may be changed depending on rotation of the eccentric cam 40 in the aperture of the small end 22. In other words, as the eccentric cam 40 rotates in the aperture of the small end 22 to change a relative position of the piston 10 for the small end 22 of the connecting rod 20, a compression ratio of the mixture may be changed.

The acting oil passages 25, 26, and 28 may be formed at the connecting rod 20, thereby supplying hydraulic pressure for selectively latching the eccentric cam 40 to the small end 22 of the connecting rod 20. In this regard, the eccentric cam 40 may be selectively latched to the small end 22 in one among at least two relative positions between the piston 10 and the connecting rod 20 small end 22 that are differently required depending on a driving condition of an engine. In addition, the acting oil passages 25, 26, and 28 may be formed to receive hydraulic pressure from oil passages which are formed at the crankshaft 30, the balance weight 32, and the crankpin 34. Herein, the oil passages formed at the crankshaft 30, the balance weight 32, and the crankpin 34 and supply of hydraulic pressure therethrough are well known to a person of ordinary skill in the art, so detailed descriptions thereof will be omitted.

FIGS. 4 to 7 are operational views of a variable compression ratio apparatus according to one exemplary embodiment of the present invention. As shown in FIGS. 3 to 7, the variable compression ratio apparatus 1 according to an exemplary embodiment of the present invention may further include a first plate 42, a second plate 44, a fastening pin 46, and a latching pin 50, and the acting oil passages 25, 26, and 28 include a first oil passage 25, a second oil passage 26, and a communication chamber 28.

The first plate 42 may be disposed to cover a first opened surface of the aperture of the small end 22 in which the eccentric cam 40 is inserted and seated. Meanwhile, the drawings illustrate that the first plate 42 is formed with a circular shape to have a diameter which is greater than a diameter of the eccentric cam 40, but it is not limited to a circular shape as long as the first plate 42 has a size that is capable of covering the aperture of the small end 22. In addition, the piston pin insertion aperture 12, through which the piston pin 12 is passed, may be formed at the first plate 42.

The second plate 44 may be disposed to cover a second opened surface of the aperture of the small end 22 in which the eccentric cam 40 is inserted and seated. Meanwhile, the drawings illustrate that the second plate 44 is formed in a circular shape to have a diameter which is greater than a diameter of the eccentric cam 40, but it is not limited thereto as long as the second plate 44 has a size that is capable of covering the aperture of the small end 22. In addition, the piston pin insertion aperture 12, through which the piston pin 12 is passed, may be formed at the second plate 44. In other words, the first plate 42 and the second plate 44 may be disposed at respective sides to prevent the eccentric cam 40 from escaping or being withdrawn from the small end 22, and the piston pin 12 may be inserted to sequentially penetrate a first side of the piston 10, the first plate 42, the eccentric cam 40, the second plate 44, and a second side of the piston 10.

The fastening pin 46 may fasten the first plate 42 and the second plate 44 to the eccentric cam 40. In addition, the fastening pin 46 may sequentially penetrate the first plate 42, the eccentric cam 40, and the second plate 44 through a pin aperture 46h (referring to FIGS. 10 and 11). Further, the first plate 42 and the second plate 44, which are fixed to the eccentric cam 40 by the fastening pin 46, move together with the eccentric cam 40. In other words, the first plate 42 and the second plate 44 may be configured to rotate together with the eccentric cam 40. Therefore, the eccentric cam 40 may be latched to the small end 22 when one among the first plate 42 and the second plate 44 is latched to the small end 22 of the connecting rod 20.

The first oil passage 25 may be formed in a length direction of the connecting rod 20. In addition, the first oil passage 25 may extend from the larger end 24 to the small end 22 to latch the eccentric cam 40 with the small end 22 using hydraulic pressure supplied from the oil passages formed at the crankshaft 30, the balance weight 32, and the crankpin 34. Meanwhile, hydraulic pressure used for latching the eccentric cam 40 with the small end 22 may be released via the oil passages formed at the crankshaft 30, the balance weight 32, and the crankpin 34 and the first oil passage 25. Further, the first oil passage 25 may be disposed to be proximate to the first plate 42.

The second oil passage 26 may be formed in a length direction of the connecting rod 20. In addition, the second oil passage 26 may extend from the larger end 24 to the small end 22 to achieve latching of the eccentric cam 40 with the small end 22 using hydraulic pressure supplied from the oil passages formed at the crankshaft 30, the balance weight 32, and the crankpin 34. In other words, the second oil passage 26 may be formed in parallel with the first oil passage 25. Meanwhile, hydraulic pressure used for latching the eccentric cam 40 with the small end 22 may be released via the oil passages formed at the crankshaft 30, the balance weight 32, the crankpin 34, and the second oil passage 26, and in this regard, hydraulic pressure that has been supplied through the first oil passage 25 may be released through the second oil passage 26 and hydraulic pressure has been supplied through the second oil passage 26 may be released through the first oil passage 25. Further, the second oil passage 26 may be disposed to be proximate to the second plate 44.

The communication chamber 28 may be formed at the small end 22, and is a space that provides communication between the first oil passage 25 and the second oil passage 26. In other words, the communication chamber 28 may be formed to be extended in parallel with a direction of axis of rotation of the small end 22. The latching pin 50 may be arranged in the communication chamber 28. In addition, the latching pin 50 may be disposed to generate a reciprocal rectilinear motion in a direction of extending the communication chamber 28. Herein, the latching pin 50 may be moved in one direction (e.g., a first direction) by hydraulic pressure supplied through the first oil passage 25 and may be moved in an opposite direction (e.g., a second direction) by hydraulic pressure supplied through the second oil passage 26, thereby realizing a reciprocal rectilinear motion of the latching pin 50. In addition, the small end 22 may be latched with one among the first plate 42 and the second plate 44 as the latching pin 50 is moved by hydraulic pressure.

The variable compression ratio apparatus 1 according to one exemplary embodiment of the present invention is configured so that the latching pin 50 may form a first inflow aperture 51, a first outflow aperture 52, a first guide groove 53, a second inflow aperture 56, a second outflow aperture 57, and a second guide groove 58 (referring to FIGS. 4 to 7). The first inflow aperture 51 may extend in parallel with a length direction of the connecting rod 20. In addition, the first inflow aperture 51 is an aperture in which hydraulic pressure may be transferred from the first oil passage 25, and may be positioned to communicate with the first oil passage 25 in a state that either one among the first plate 42 and the second plate 44 is not latched with the small end 22.

The first outflow aperture 52 may communicate with the first inflow aperture 51 and extend in parallel with an axis of rotation of the small end 22. In addition, the first outflow aperture 52 is an aperture for discharging hydraulic pressure transferring through the first inflow aperture 51 toward the first plate 42. The first guide groove 53 may be formed along an external circumference of the latching pin 50 to communicate with the first inflow aperture 51. In addition, the first guide groove 53, which is a groove for guiding hydraulic pressure to transfer hydraulic pressure supplied from the first oil passage 25 in the first inflow aperture 51, may transfer hydraulic pressure into the first inflow aperture 51 even while an opening of the first inflow aperture 51 is not positioned to face the first oil passage 25 in the communication chamber 28 by rotation of the latching pin 50.

The second inflow aperture 56 may extend in parallel with a length direction of the connecting rod 20. In addition, the second inflow aperture 56 is an aperture in which hydraulic pressure is transferred from the second oil passage 26, and may be positioned to communicate with the second oil passage 26 in a state that either one among the first plate 42 and the second plate 44 is not latched with the small end 22. The second outflow aperture 57 may communicate with the second inflow aperture 56 and extend in parallel with an axis of rotation of the small end 22. In addition, the second outflow aperture 57 is an aperture for discharging hydraulic pressure transferring through the second inflow aperture 56 toward the second plate 44.

The second guide groove 58 may be formed along an external circumference of the latching pin 50 to communicate with the second inflow aperture 56. In addition, the second guide groove 58, which is a groove for guiding hydraulic pressure to transfer hydraulic pressure supplied from the second oil passage 26 in the second inflow aperture 56, may transfer hydraulic pressure into the second inflow aperture 56 even when an opening the second inflow aperture 56 is not positioned to face the second oil passage 26 in the communication chamber 28 by rotation of the latching pin 50.

Figure 4:
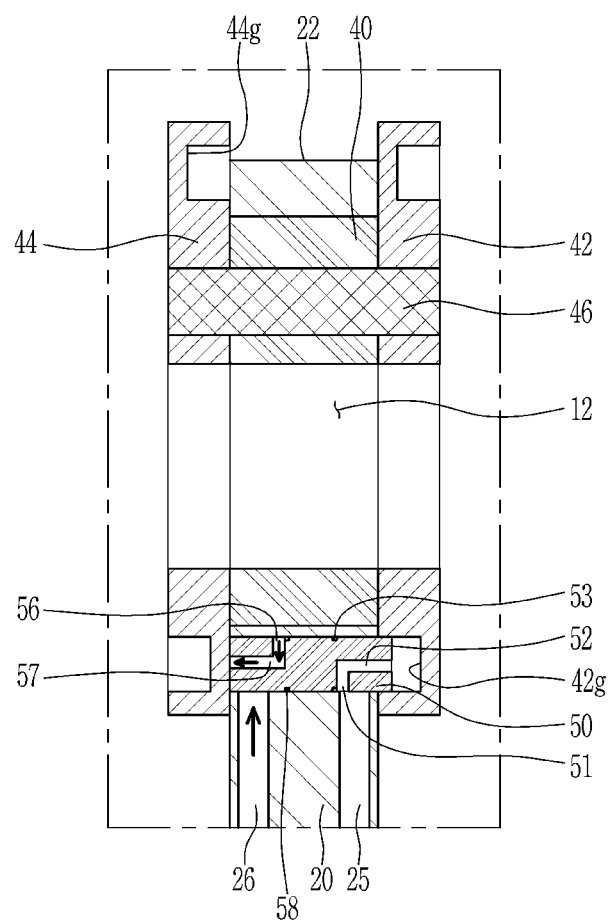
FIGS. 4 to 7 are operational views of a variable compression ratio apparatus according to one exemplary embodiment of the present invention.

Hereinafter, operation of the variable compression ratio apparatus 1 according to one exemplary embodiment of the present invention will be described referring to FIGS. 4 to 7. As shown in FIG. 4, in the variable compression ratio apparatus 1 according to one exemplary embodiment of the present invention, a force for moving the latching pin 50 toward the first plate 42 may be generated as hydraulic pressure being transferred out from the second outflow aperture 57 toward the second plate 44 pushes an interior surface of the second plate 44 when hydraulic pressure that is sequentially transferred through the second oil passage 26, the second inflow aperture 56, and the second outflow aperture 57 is supplied. For convenience of description, surfaces to face the eccentric cam 40 of the first plate 42 and the second plate 44 will be defined to "interior surfaces".

Figure 5:
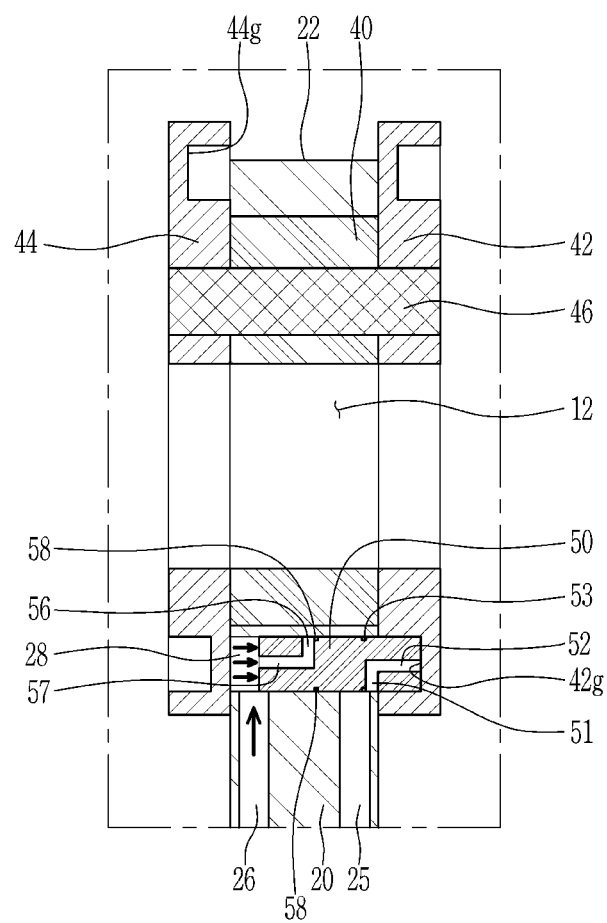

As shown in FIG. 5, while maintaining the force for moving the latching pin 50 toward the first plate 42, the latching pin 50 may be moved to be inserted into a first latching groove 42g when the first latching groove 42g recessed from an interior surface of the first plate 42 is positioned to correspond with the communication chamber 28 depending on rotation of the eccentric cam 40, the first plate 42, and the second plate 44. Herein, the first latching groove 42g may be formed in a shape that corresponds with the communication chamber 28 and the latching pin 50. At this time, a motion of the latching pin 50 may be performed rapidly as hydraulic pressure transferring through the second oil passage 26 is directly supplied into a space formed by moving the latching pin 50 between the latching pin 50 and an interior surface of the second plate 44 in the communication chamber 28. In this regard, the small end 22 may be latched to the eccentric cam 40 when the latching pin 50 is moved to be inserted into the first latching groove 42g.

Figure 6:
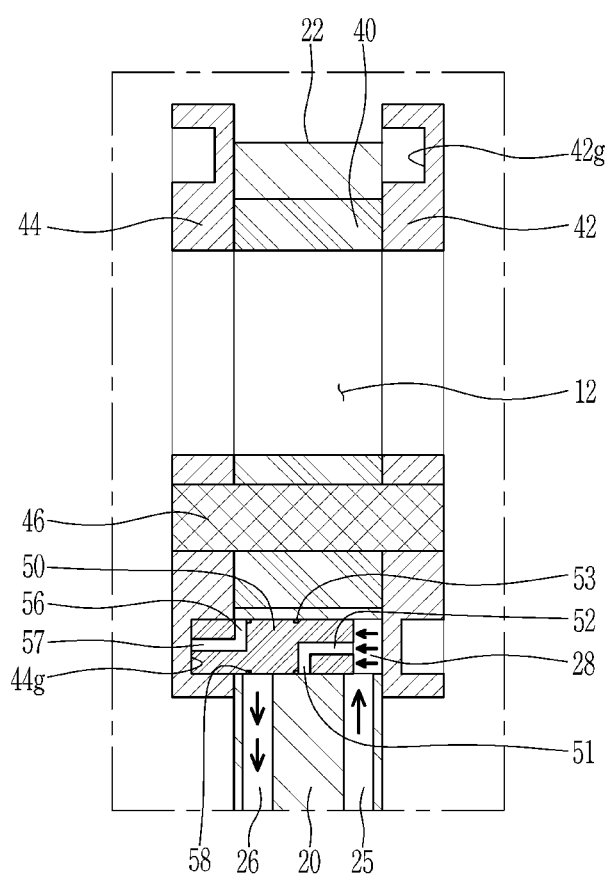

As shown in FIG. 6, in the variable compression ratio apparatus 1 according to one exemplary embodiment of the present invention, a force for moving the latching pin 50 toward the second plate 44 may be generated as hydraulic pressure being transferred out from the first outflow aperture 52 toward the first plate 42 pushes an interior surface of the first plate 42 when hydraulic pressure sequentially transferring through the first oil passage 25, the first inflow aperture 51, and the first outflow aperture 52 is supplied, and the latching pin 50 may be moved to be inserted into a second latching groove 44g when the second latching groove 44g recessed from an interior surface of the second plate 44 is positioned to correspond with the communication chamber 28 depending on rotation of the eccentric cam 40, the first plate 42, and the second plate 44 while maintaining the force for moving the latching pin 50 toward the second plate 44.

Herein, the second latching groove 44g may be formed in a shape that corresponds with the communication chamber 28 and the latching pin 50. At this time, a motion of the latching pin 50 may be performed rapidly as hydraulic pressure transferring through the first oil passage 25 is directly supplied into a space formed by moving the latching pin 50 between the latching pin 50 and an interior surface of the first plate 42 in the communication chamber 28. In this regard, the small end 22 may be latched to the eccentric cam 40 when the latching pin 50 is moved to be inserted into the second latching groove 44g.

The drawings illustrate that a low compression ratio condition of an engine is achieved as a distance between the piston pin 12 and the crankpin 34 is relatively near, that is, the piston 10 may be positioned to be relatively low when the latching pin 50 is inserted into the first latching groove 42g to latch the small end 22 to the eccentric cam 40. A high compression ratio condition of an engine is achieved as a distance between the piston pin 12 and the crankpin 34 is relatively far, that is, the piston 10 may be positioned to be relatively high when the latching pin 50 is inserted into the second latching groove 44g to latch the small end 22 to the eccentric cam 40. Herein, a low compression ratio and a high compression ratio of an engine may be determined depending on the positions of forming the first latching groove 42g and the second latching groove 44g.

Figure 7:
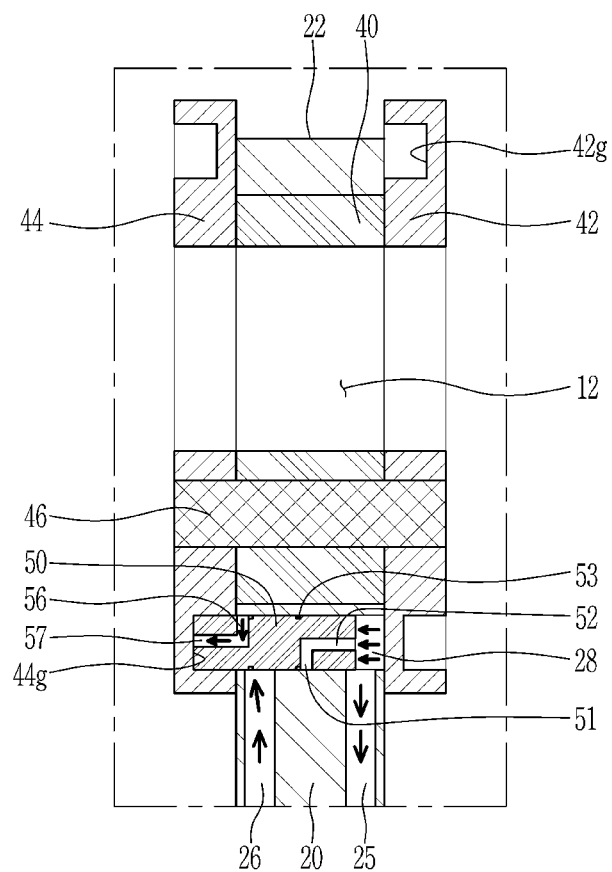

As shown in FIG. 7, operation of returning the latching pin 50 into the state that either one among the first plate 42 and the second plate 44 is not latched with the small end 22 may be performed as hydraulic pressure is supplied through the first oil passage 25 when the latching pin 50 is inserted into the first latching groove 42g and hydraulic pressure may be supplied through the second oil passage 26 when the latching pin 50 is inserted into the second latching groove 44g. In other words, the latching pin 50 may be distant from the first latching groove 42g to be returned to an original position as hydraulic pressure being transferred out from the first outflow aperture 52 pushes an interior surface of the first plate 42 of the first latching groove 42g when the latching pin 50 is inserted into the first latching groove 42g. Additionally, the latching pin 50 may be distant from the second latching groove 44g to be returned to an original position as hydraulic pressure being transferred out from the second outflow aperture 57 pushes an interior surface of the second plate 44 of the second latching groove 44g when the latching pin 50 is inserted into the second latching groove 44g.

Figure 8:
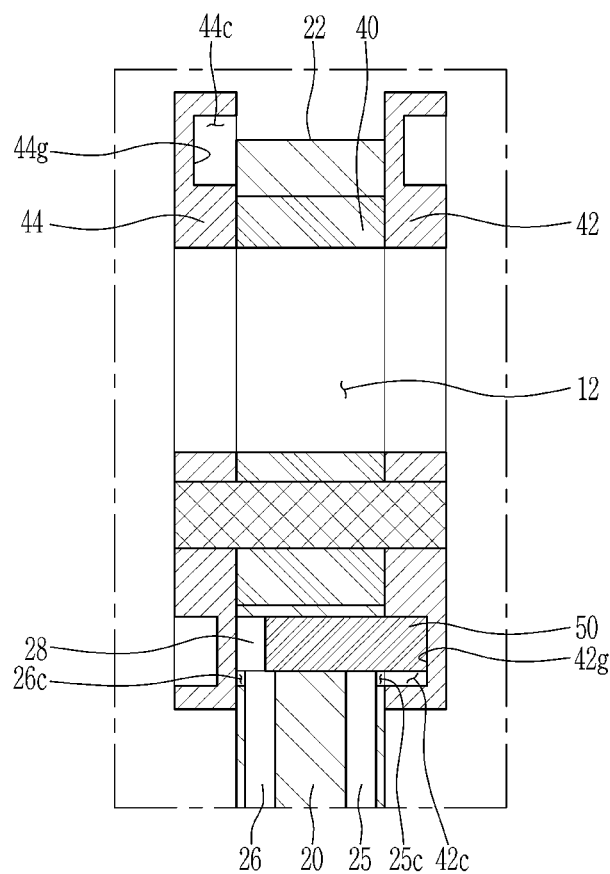
FIG. 8 is a drawing for describing operation of a variable compression ratio apparatus according to another exemplary embodiment of the present invention.

FIG. 8 is a drawing for describing operation of a variable compression ratio apparatus according to another exemplary embodiment of the present invention. As shown in FIG. 8, the variable compression ratio apparatus 1 according to the other exemplary embodiment of the present invention may include a first passage chamber 25c, a first plate chamber 42c, a second passage chamber 26c, and a second plate chamber 44c instead of the first inflow aperture 51, the first outflow aperture 52, the first guide groove 53, the second inflow aperture 56, the second outflow aperture 57, and the second guide groove 58.

In other words, oil passages are different in the variable compression ratio apparatus 1 according to the second exemplary embodiment of the present invention in comparison with the variable compression ratio apparatus 1 according to first exemplary embodiment of the present invention. Meanwhile, in the description regarding the variable compression ratio apparatus 1 according to the other or second exemplary embodiment of the present invention, repeated descriptions regarding constituent elements which are same as in the description regarding the variable compression ratio apparatus 1 according to one or first exemplary embodiment of the present invention except that the first inflow aperture 51, the first outflow aperture 52, the first guide groove 53, the second inflow aperture 56, the second outflow aperture 57, and the second guide groove 58 are removed in the latching pin 50 and the first passage chamber 25c, the first plate chamber 42c, the second passage chamber 26c, and the second plate chamber 44c are additionally provided without regard to the latching pin 50, will be omitted.

The first passage chamber 25c is a space formed at a circumference of the communication chamber 28 to provide communication between the first oil passage 25 and the communication chamber 28. In addition, the first passage chamber 25c may provide communication between the first oil passage 25 and the first latching groove 42g when the first latching groove 42g is positioned to correspond with the communication chamber 28. At this time, the first passage chamber 25c may communicate with the first plate chamber 42c. The first plate chamber 42c is a space formed at a circumference of the first latching groove 42g. In addition, the first plate chamber 42c may be positioned to correspond with the first passage chamber 25c when the first latching groove 42g is positioned to correspond with the communication chamber 28.

The second passage chamber 26c is a space formed at a circumference of the communication chamber 28 to provide communication between the second oil passage 26 and the communication chamber 28. In addition, the second passage chamber 26c may provide communication between the second oil passage 26 and the second latching groove 44g when the second latching groove 44g is positioned to correspond with the communication chamber 28. The second passage chamber 26c may communicate with the second plate chamber 44c. The second plate chamber 44c is a space formed at a circumference of the second latching groove 44g. In addition, the second plate chamber 44c may be positioned to correspond with the second passage chamber 26c when the second latching groove 44g is positioned to correspond with the communication chamber 28.

Hereinafter, operation of the variable compression ratio apparatus 1 according to the other exemplary embodiment of the present invention will be described referring to FIG. 8. In the variable compression ratio apparatus 1 according to the other exemplary embodiment of the present invention, hydraulic pressure may be stored in the second passage chamber 26c to be transferred between an interior surface of the second plate 44 and the latching pin 50 when hydraulic pressure sequentially transferring through the second oil passage 26 and the second passage chamber 26c is supplied.

The latching pin 50 may be moved to be inserted into the first latching groove 42g as hydraulic pressure stored in the second passage chamber 26c is transferred between the latching pin 50 and an interior surface of the second plate 44 when the first latching groove 42g is positioned to correspond with the communication chamber 28 depending on the eccentric cam 40, the first plate 42, and the second plate 44 when storing hydraulic pressure in the second passage chamber 26c. At this time, a motion of the latching pin 50 may be performed rapidly as hydraulic pressure transferring through the second oil passage 26 is directly supplied into a space formed by moving the latching pin 50 between the latching pin 50 and an interior surface of the second plate 44 in the communication chamber 28. In particular, the small end 22 may be latched to the eccentric cam 40 when the latching pin 50 is moved to be inserted into the first latching groove 42g.

Only operation of inserting the latching pin 50 into the first latching groove 42g is illustrated in FIG. 8, but hydraulic pressure may be stored in the first passage chamber 25c to be transferred between an interior surface of the first plate 42 and the latching pin 50 when hydraulic pressure sequentially transferring through the first oil passage 25 and the first passage chamber 25c is supplied in the variable compression ratio apparatus 1 according to the other exemplary embodiment of the present invention.

Further, the latching pin 50 may be moved to be inserted into the second latching groove 44g as hydraulic pressure stored in the first passage chamber 25c is transferred between the latching pin 50 and an interior surface of the first plate 42 when the second latching groove 44g is positioned to correspond with the communication chamber 28 depending on the eccentric cam 40, the first plate 42, and the second plate 44 in a state of storing hydraulic pressure in the first passage chamber 25c. At this time, a motion of the latching pin 50 may be performed rapidly as hydraulic pressure transferring through the first oil passage 25 is directly supplied into a space formed by moving the latching pin 50 between the latching pin 50 and an interior surface of the first plate 42 in the communication chamber 28. In particular, the small end 22 may be latched to the eccentric cam 40 when the latching pin 50 is moved to be inserted into the second latching groove 44g.

An operation of returning the latching pin 50 into the state that either one among the first plate 42 and the second plate 44 is not latched with the small end 22 may be performed as hydraulic pressure is supplied through the first oil passage 25 when the latching pin 50 is inserted into the first latching groove 42g and hydraulic pressure may be supplied through the second oil passage 26 when the latching pin 50 is inserted into the second latching groove 44g. In other words, the latching pin 50 may be moved to be distant from the first latching groove 42g to be returned to an original position as hydraulic pressure sequentially transferring through the first oil passage 25, the first passage chamber 25c, and the first plate chamber 42c is transferred between the latching pin 50 and an interior surface of the first plate 42 when the latching pin 50 is inserted into the first latching groove 42g. Additionally, the latching pin 50 may be moved to be distant from the second latching groove 44g to be returned to an original position as hydraulic pressure sequentially transferring through the second oil passage 26, the second passage chamber 26c, and the second plate chamber 44c is transferred between the latching pin 50 and an interior surface of the first plate 42 when the latching pin 50 is inserted into the second latching groove 44g.

Figure 9:
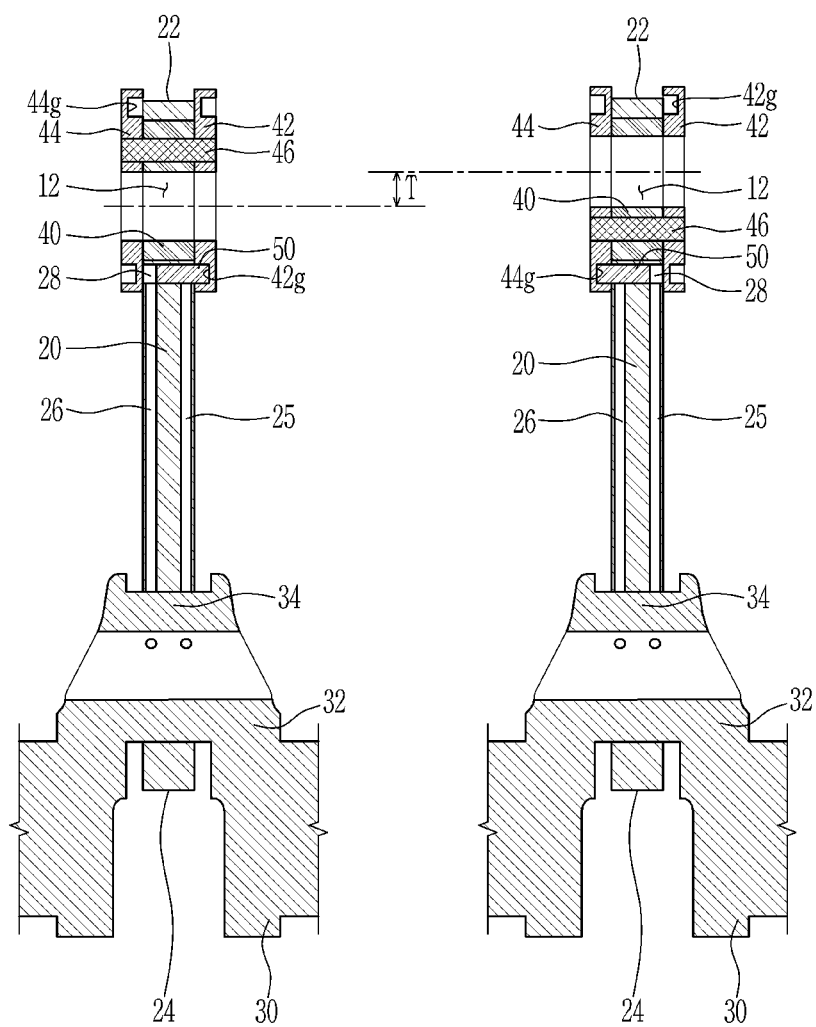
FIG. 9 is a schematic diagram for comparing a position for a low compression ratio with a position for a high compression ratio of a piston according to an exemplary embodiment of the present invention.

FIG. 9 is a schematic diagram for comparing a position in a low compression ratio with a position in a high compression ratio of a piston according to an exemplary embodiment of the present invention. As shown in FIG. 9, top dead center of the piston 10 in the condition that an engine is driven at a low compression ratio as the latching pin 50 is inserted into the first latching groove 42g and top dead center of the piston 10 in the condition that an engine is driven at a high compression ratio as the latching pin 50 is inserted into the second latching groove 44g are different from each other as a predetermined value T. In FIG. 9, the difference value T between top dead center of the piston 10 in the condition that an engine is driven at a low compression ratio and top dead center of the piston 10 in the condition that an engine is driven at a high compression ratio is illustrated as a difference between lines extended from an axial center of the piston pin insertion aperture 12 in each condition.

Figure 10:
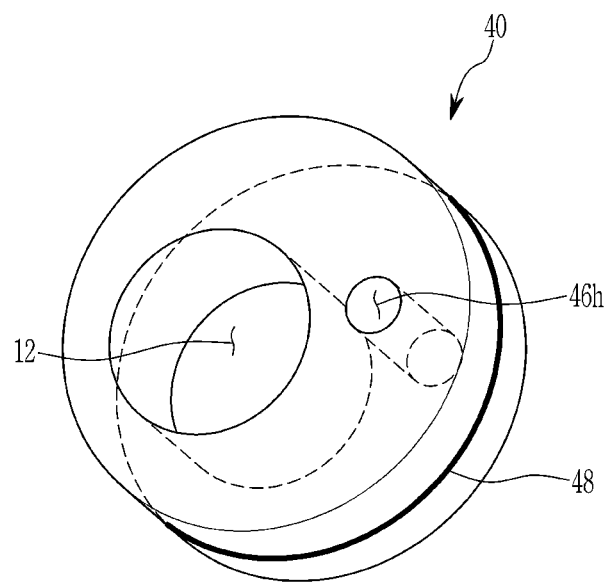
FIG. 10 is a perspective view of an eccentric cam according to an exemplary embodiment of the present invention.
Figure 11:
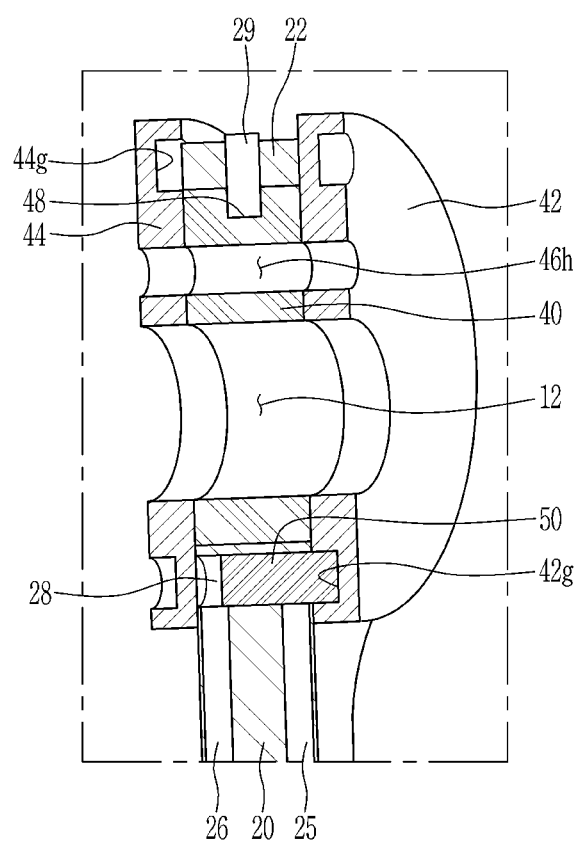
FIG. 11 is a drawing illustrating a composition for limiting rotation of an eccentric cam according to an exemplary embodiment of the present invention.

FIG. 10 is a perspective view of an eccentric cam according to an exemplary embodiment of the present invention, and FIG. 11 is a drawing illustrating a composition for limiting rotation of an eccentric cam according to an exemplary embodiment of the present invention. As shown in FIGS. 10 and 11, a stopper rail 48, which is recessed with a set length along an external circumference, may be formed at the eccentric cam 40, and a stopper 29 may protrude toward the eccentric cam 40 on an interior circumference of the small end 22.

The stopper 29 may be integrally formed with the small end 22 or may be inserted into the small end 22 in a radial direction to protrude toward the eccentric cam 40. In addition, the stopper 29 may be inserted into the stopper rail 48 and may be blocked to one among both ends of the stopper rail 48 in a circumference direction of the eccentric cam 40 when the eccentric cam 40 is relatively rotated from the small end 22, thereby limiting rotation of the eccentric cam 40. Herein, the eccentric cam 40 may be positioned such that the first latching groove 42g corresponds with the communication chamber 28 when the stopper 29 is blocked to one end (e.g., a first end) among both ends of the stopper rail 48. The eccentric cam 40 may be positioned such that the second latching groove 44g corresponds with the communication chamber 28 when the stopper 29 is blocked to the other end (e.g., a second end) among both ends of the stopper rail 48. Therefore, as the stopper 29 limits rotation of the eccentric cam 40, latching of the small end 22 and the eccentric cam 40 by inserting the latching pin 50 into the first latching groove 42g and latching of the small end 22 and the eccentric cam 40 by inserting latching pin 50 into the second latching groove 44g may be performed more smoothly.

According to an exemplary embodiment of the present invention, manageability of control may be improved as a composition for limiting rotation of the eccentric cam 40 is simplified. In addition, interference by rotational inertia in latching the eccentric cam 40 may be prevented and cost may be reduced as the latching pin 50 adapted to have a simplified composition and moved in a direction which is arranged in parallel with the crankshaft 30 is provided. Further, operational reliability may be improved as the acting oil passages 25, 26, and 28 for the latching pin 50 are simplified.

While this invention has been described in connection with what is presently considered to be exemplary embodiments, it is to be understood that the invention is not limited to the disclosed exemplary embodiments, but, on the contrary, is intended to cover various modifications and equivalent arrangements included within the spirit and scope of the appended claims.

What is claimed is:

1. A variable compression ratio (VCR) apparatus installed in an engine rotating a crankshaft upon receiving combustion power of a mixture from a piston and changes a compression ratio of the mixture according to a driving condition of the engine, the VCR apparatus comprising:
   a connecting rod at which a small end forming an aperture having a circular shape to be rotatably connected with a piston pin moving together with the piston, a larger end rotatably connected with a crankpin eccentrically arranged with respect to the crankshaft, and an acting oil passage formed to allow hydraulic pressure to be supplied from the larger end to the small end, are formed;
   an eccentric cam concentrically arranged and rotatably disposed in the aperture of the small end and the piston pin is eccentrically inserted thereinto and is rotatably connected therewith;
   a first plate disposed to cover a first opened surface of the small end in which the eccentric cam is inserted and seated, fixed to the eccentric cam by a fastening pin, and the piston pin is rotatably connected thereto;
   a second plate disposed to cover a second opened surface of the small end in which the eccentric cam is inserted and seated, fixed to the eccentric cam by the fastening pin, and the piston pin is rotatably connected thereto; and
   a latching pin operated by hydraulic pressure supplied to the small end through the acting oil passages to be selectively inserted into one among the first plate and the second plate for selectively latching the small end with the eccentric cam in one among at least two relative positions.

2. The VCR apparatus of claim 1, wherein the acting oil passage includes:
   a first oil passage that extends from the larger end to the small end in a length direction of the connecting rod to receive hydraulic pressure transferred through the crankshaft and disposed to be proximate to the first plate;
   a second oil passage that extends from the larger end to the small end in a length direction of the connecting rod to receive hydraulic pressure transferred through the crankshaft and disposed to be proximate to the second plate; and
   a communication chamber that extends in a direction of an axis of rotation in the small end to provide communication between the first oil passage and the second oil passage,
   wherein the latching pin is disposed in the communication chamber to cause a reciprocal rectilinear motion to be moved toward the second plate by hydraulic pressure supplied through the first oil passage and be moved toward the first plate by hydraulic pressure supplied through the second oil passage.

3. The VCR apparatus of claim 2, wherein the latching pin is inserted into a first latching groove to latch the small end with the eccentric cam when the first latching groove recessed from an interior surface of the first plate is positioned to correspond with the communication chamber depending on rotation of the eccentric cam while maintaining hydraulic pressure for moving the latching pin toward the first plate.

4. The VCR apparatus of claim 3, wherein a low compression ratio condition of the engine is achieved as top dead center of the piston is to be relatively low when the latching pin is inserted into the first latching groove to latch the small end to the eccentric cam.

5. The VCR apparatus of claim 3, wherein operation of returning the latching pin into a state that the small end is not latched to the eccentric cam is performed as hydraulic pressure is supplied through the first oil passage while inserting the latching pin into the first latching groove.

6. The VCR apparatus of claim 2, wherein the latching pin is inserted into a second latching groove to latch the small end with the eccentric cam when the second latching groove recessed from an interior surface of the second plate is positioned to correspond with the communication chamber depending on rotation of the eccentric cam while maintaining hydraulic pressure for moving the latching pin toward the second plate.

7. The VCR apparatus of claim 6, wherein a high compression ratio condition of the engine is achieved as top dead center of the piston is to be relatively high when the latching pin is inserted into the second latching groove to latch the small end to the eccentric cam.

8. The VCR apparatus of claim 6, wherein operation of returning the latching pin into a state that the small end is not latched to the eccentric cam is performed as hydraulic pressure is supplied through the second oil passage while inserting the latching pin into the second latching groove.

9. The VCR apparatus of claim 2, wherein the latching pin forms:
- a first inflow aperture that extends in parallel with a length direction of the connecting rod to transfer hydraulic pressure therein from the first oil passage;
- a first outflow aperture in communication with the first inflow aperture to transfer hydraulic pressure transferring through the first inflow aperture out toward the first plate and that extends in a direction of the axis of rotation of the small end;
- a first guide groove that extends along an external circumference of the latching pin to communicate with the first inflow aperture;
- a second inflow aperture that extends in parallel with a length direction of the connecting rod to transfer hydraulic pressure therein from the second oil passage;
- a second outflow aperture in communication with the second inflow aperture to transfer hydraulic pressure transferring through the second inflow aperture out toward the second plate and that extends in a direction of the axis of rotation of the small end; and
- a second guide groove that extends along an external circumference of the latching pin to communicate with the second inflow aperture.

10. The VCR apparatus of claim 9, wherein the first inflow aperture is positioned to communicate with the first oil passage in a state that the small end is not latched to the eccentric cam, and the second inflow aperture is positioned to communicate with the second oil passage in a state that the small end is not latched to the eccentric cam.

11. The VCR apparatus of claim 9, wherein the first guide groove transfers hydraulic pressure into the first inflow aperture even while the first inflow aperture is not positioned to face the first oil passage by rotation of the latching pin, and the second guide groove transfers hydraulic pressure into the second inflow aperture even while the second inflow aperture is not positioned to face the second oil passage by rotation of the latching pin.

12. The VCR apparatus of claim 9, wherein a force for moving the latching pin toward the first plate is generated as hydraulic pressure being transferred out from the second outflow aperture pushes an interior surface of the second plate when hydraulic pressure sequentially transferring through the second oil passage, the second inflow aperture, and the second outflow aperture is supplied, and while maintaining this force, the latching pin is inserted into a first latching groove to latch the small end to the eccentric cam when the first latching groove recessed from an interior surface of the first plate is positioned to correspond with the communication chamber depending on rotation of the eccentric cam.

13. The VCR apparatus of claim 12, wherein a force for moving the latching pin toward the second plate is generated as hydraulic pressure being transferred out from the first outflow aperture pushes an interior surface of the first plate when hydraulic pressure sequentially transferring through the first oil passage, the first inflow aperture, and the first outflow aperture is supplied, and while maintaining this force, the latching pin is inserted into a second latching groove to latch the small end to the eccentric cam when the second latching groove recessed from an interior surface of the second plate is positioned to correspond with the communication chamber depending on rotation of the eccentric cam.

14. The VCR apparatus of claim 13, wherein when the small end is latched with the eccentric cam by inserting the latching pin into the first latching groove, a first among a low compression ratio condition of the engine by a relatively low top dead center of the piston and a high compression ratio condition of the engine by a relatively high top dead center of the piston is achieved, and when the small end is latched with the eccentric cam by inserting the latching pin into the second latching groove, a second among a low compression ratio condition of the engine by a relatively low top dead center of the piston and a high compression ratio condition of the engine by a relatively high top dead center of the piston is achieved.

15. The VCR apparatus of claim 2, wherein the acting oil passage further includes:
- a first passage chamber formed at a circumference of the communication chamber to provide communication between the first oil passage and the communication chamber;
- a first plate chamber formed at a circumference of a first latching groove which is recessed from an interior surface of the first plate;
- a second passage chamber formed at a circumference of the communication chamber to provide communication between the second oil passage and the communication chamber; and
- a second plate chamber formed at a circumference of a second latching groove which is recessed from an interior surface of the second plate,
- wherein the first plate chamber is positioned to correspond with the first passage chamber when the first latching groove is positioned to correspond with the communication chamber depending on rotation of the eccentric cam, and
- wherein the second plate chamber is positioned to correspond with the second passage chamber when the second latching groove is positioned to correspond with the communication chamber depending on rotation of the eccentric cam.

16. The VCR apparatus of claim 15, wherein hydraulic pressure is stored in the second passage chamber to be transferred between an interior surface of the second plate and the latching pin when hydraulic pressure sequentially transferring through the second oil passage and the second passage chamber is supplied, and the latching pin is inserted into the first latching groove to latch the small end to the eccentric cam as hydraulic pressure stored in the second passage chamber is transferred between the latching pin and an interior surface of the second plate when the first latching groove is positioned to correspond with the communication chamber depending on rotation of the eccentric cam.

17. The VCR apparatus of claim 16, wherein hydraulic pressure is stored in the first passage chamber to be transferred between an interior surface of the first plate and the latching pin when hydraulic pressure sequentially transferring through the first oil passage and the first passage chamber is supplied, and the latching pin is inserted into the second latching groove to latch the small end to the eccentric cam as hydraulic pressure stored in the first passage chamber is transferred between the latching pin and an interior surface of the first plate when the second latching groove is positioned to correspond with the communication chamber depending on rotation of the eccentric cam.

18. The VCR apparatus of claim 17, wherein a first among a low compression ratio condition of the engine by a relatively low top dead center of the piston and a high compression ratio condition of the engine by a relatively high top dead center of the piston is achieved when the latching pin is inserted into the first latching groove to latch the small end to the eccentric cam, and a second among a low compression ratio condition of the engine by a relatively low top dead center of the piston and a high compression ratio condition of the engine by a relatively high top dead center of the piston is achieved when the latching pin is inserted into the second latching groove to latch the small end to the eccentric cam.

19. The VCR apparatus of claim 17, wherein an operation of returning the latching pin into a state that the small end is not latched to the eccentric cam is performed as hydraulic pressure sequentially transferring through the first oil passage, the first passage chamber, and the first plate chamber is transferred in the first latching groove while inserting the latching pin into the first latching groove and is performed as hydraulic pressure sequentially transferring through the second oil passage, the second passage chamber, and the second plate chamber is transferred in the second latching groove while inserting the latching pin into the second latching groove.

20. The VCR apparatus of claim 2, further comprising:
a stopper rail recessed with a set length along an external circumference of the eccentric cam; and
a stopper that protrudes from an interior circumference of the small end toward the eccentric cam,
wherein the stopper is inserted into the stopper rail and is blocked to a first of the stopper rail in a circumference direction of the eccentric cam when the eccentric cam is relatively rotated from the small end, thereby limiting rotation of the eccentric cam.

21. The VCR apparatus of claim 20, wherein the small end is latched with the eccentric cam by inserting the latching pin into one among the first plate and the second plate when the stopper is blocked to a first end of the stopper rail, and the small end is latched with the eccentric cam by inserting the latching pin into the other one among the first plate and the second plate when the stopper is blocked to a second end of the stopper rail.

* * * * *